United States Patent [19]

Titus, IV et al.

[11] 4,381,527
[45] Apr. 26, 1983

[54] CASSETTE CHANGING METHOD AND APPARATUS

[75] Inventors: Theodore Titus, IV, Tucker; Timothy D. Cutler, Atlanta, both of Ga.

[73] Assignee: Lanier Business Products, Inc., Atlanta, Ga.

[21] Appl. No.: 78,232

[22] Filed: Sep. 24, 1979

[51] Int. Cl.³ .................. G11B 15/68; G11B 15/24
[52] U.S. Cl. .................................. 360/92; 360/71; 360/96.5
[58] Field of Search .......... 360/92, 91, 96.5, 96.3, 360/71; 242/197-200; 179/100.1 DR

[56] References Cited

U.S. PATENT DOCUMENTS

| 3,467,790 | 9/1969 | Bolick, Jr. ............... 179/100.1 DR |
| 3,667,624 | 6/1972 | Ogura et al. ............... 414/108 |
| 3,758,122 | 9/1973 | Kawaharasaki ............... 360/92 |
| 3,996,617 | 12/1976 | Cousino ............... 360/92 |
| 4,024,354 | 5/1977 | Bolick, Jr. et al ........ 179/100.1 DR |
| 4,071,857 | 1/1978 | Whitney et al. ............... 360/92 |
| 4,075,436 | 2/1978 | Bolick, Jr. et al. ....... 179/100.1 DR |
| 4,092,679 | 5/1978 | Sander ............... 360/92 |
| 4,092,685 | 5/1978 | Sander et al. ............... 360/92 |
| 4,145,724 | 3/1979 | Medding ............... 360/92 |

Primary Examiner—Alfred H. Eddleman
Attorney, Agent, or Firm—Jones & Askew

[57] ABSTRACT

A cassette changing mechanism including a plurality of followers with friction clutches thereon for moving cassettes. Limit switches serve a duel function as mechanical stops for the followers and for signaling a controller. Cassettes are moved to a record/playback position and to output stores simultaneously with positive drive to the output stores and spring linked drive the record/playback position to eliminate hard jams. The controller detects the failure of the changer to complete a subcycle of a complete change cycle and repeats an appropriate subcycle to attempt to correct a jammed condition.

9 Claims, 11 Drawing Figures

CASSETTE CHANGING METHOD AND APPARATUS

TECHNICAL FIELD

The present invention relates to systems for mechanically handling discrete recording media, and more particularly relates to cassette changing systems in centralized dictation/transcription systems.

BACKGROUND ART

It has long been an object in the dictation/transcription art to provide a central recorder and the capability for selectively connecting the central recorder to multiple dictation stations at locations remote from the central recorder. Such a system provides flexibility and avoids the necessity for each dictating person to have a complete dictation/transcription system.

In the implementation of this object in the art, endless loop systems were first developed, such as the one shown in U.S. Pat. No. 3,467,790. As the popularity of systems utilizing discrete recording media, such as standard-sized tape cassettes, increased, central cassette changer systems were developed for central recorders to automatically substitute a fresh cassette for recording when the previous cassette was completely used. Such a central cassette changer system is shown in U.S. Pat. No. 4,024,354. Other developments have included the provision of means for specially recording priority dictation. One such system, as shown in U.S. Pat. No. 4,075,436, utilizes a second cassette changing apparatus automatically utilized only for priority dictation. Another priority system shown in U.S. Pat. No. 4,092,685 ejects priority cassettes to a location different from the location where normal recorded cassettes are received.

SUMMARY OF THE INVENTION

Generally described, the present invention comprises an improved cassette changer system for successively positioning a plurality of discrete recording media, such as tape cassettes, in a recording or listening position with respect to a record/listen head. In the system embodying to the invention, the recording media are moved relative to a stationary transport mechanism and record/listen head. Mechanical stops and clutches are utilized to overcome the problems of motor coasting found in the prior art. According to one aspect of the present invention a controller is provided which will, upon the occurrence of a jammed condition, cause the changer system to execute mechanical steps to "unjam" the apparatus and proceed with normal operation.

More particularly described, the present invention provides a changing apparatus for successively engaging a plurality of discrete recording media with a transport mechanism associated with a record/listen head, comprising a channel defining a longitudinally extending path running adjacent to the transport mechanism, an input magazine adjacent to the channel for storing a plurality of the recording media; an output magazine adjacent to the channel and longitudinally spaced from the input magazine for receiving recorded recording media, channel load means for continuously urging the recording media from the input magazine into the channel; a first carriage means within the channel for carrying the recording media along the channel from the input magazine to a position opposite the transport mechanism; a second carriage means within the channel for carrying the recording media along the channel from the position opposite the transport mechanism to a position opposite the output magazine; a drive means for moving the first and second carriage means in either of two opposite directions along the channel, the carriage means each being coupled by a clutch means to the drive means; transport load means for moving a recording medium in the channel transversely from the path into and out of engagement with the transport mechanism; and an ejecting means simultaneously operative with the transport load means for moving a recording medium carried by the second carriage means transversely of the path into the output magazine.

A complete change "cycle" by a changing apparatus embodying the invention comprises the following "subcycles":

(1) simultaneously operating the transport load means to move a recording medium from engagement with the transport mechanism back to the channel and causing the ejecting means to move back to the channel, leaving an ejected recording medium in the output magazine; then (2) operating the drive means to simultaneously move the first carriage means from its "home" position opposite the input magazine to carry a recording medium urged into the channel by the channel load means to a position opposite the transport mechanism, and the second carriage means from its "home" position opposite the transport mechanism to carry the recording medium just returned by the transport load means to a position opposite either the output magazine or a priority output magazine; then (3) simultaneously operating the transport load means to move the recording media carried by the first carriage means into engagement with the transport mechanism and the ejecting means to eject the recording media carried by the second carriage means into the output or priority output magazine; and then (4) operating the drive means to move both the first and second carriage means back along the channel to their respective "home" positions.

It will be evident from the nature of the subcycles just described that a complete change cycle is required whenever the person recording on or listening to matter recorded on the recording medium engaging the transport mechanism desires to change to a fresh recording medium. Control circuitry to be described hereinbelow permits such person to initiate a complete change cycle by activating a switch.

In order to correct a jammed condition the present invention provides a failure detection means to detect a failure to complete a subcycle, and to operate the drive means in a mechanically opposite sense to execute a "reciprocal" subcycle in order to unjam the changer. The subcycle which the apparatus failed to complete will be attempted a predetermined number of times before the apparatus determines that the jammed condition cannot be corrected.

The method of the present invention comprises the steps of moving a first recording medium along a linear path from a position opposite the input magazine to a position opposite the transport mechanism, simultaneously moving a second recording medium along the linear path from the position opposite the transport mechanism to a position opposite the output magazine, thereafter moving the first recording medium out of the path into engagement with the transport mechanism and simultaneously moving the second recording medium out of the path into the output magazine, inserting a third recording medium into the path from the input magazine, returning the first recording medium from the transport mechanism to the path, and moving the third recording medium along the path to a position opposite the transport mechanism while moving the first recording medium along the path to a position opposite the output magazine.

It will be apparent from the foregoing that the carriage means must position the recording media accurately at particular locations along the channel, namely, opposite the transport mechanism, opposite the input magazine and opposite the output and priority output magazines. In order to accurately position the recording media at the proper locations along the path without relying on stopping a motor, the invention can further comprise a first stop along the channel for arresting motion of the first carriage means, moving from the input magazine toward the transport mechanism, at a location opposite the transport mechanism, and a second stop for arresting motion of the second carriage means, moving from the transport mechanism toward the output magazine, at a location opposite the output magazine. The clutch means connecting the carriage means to the drive means permits the stops to stop the carriage means at the precise location required even though the drive motor may still be running. This clutch feature also means that the first and second carriage means do not have to arrive at their respective destinations simultaneously, regardless of the fact that they are moved by a common drive means. For example, the first carriage means may arrive at the location opposite the transport mechanism first, and the clutch means will allow the first carriage means to remain precisely in position while the drive means continues to operate until the second carriage means arrives at the location opposite an output magazine.

The transport load means can comprise a movable section of the channel separable from the channel at the location opposite the transport mechanism. The movable section of channel is mounted to a pivot arm which pivots about an axis parallel to the channel to carry a recording medium within the movable section of channel from the path transversely of the path to engage the transport mechanism. Also, the pivot arm can be rotated about its axis by a "soft" drive means, such as a leaf spring, responsive to the pivot arm encountering any obstacle prior to fully completing its travel into or out of engagement with the transport mechanism to allow the pivot arm to come to rest independent of continued operation of the drive means that locates the pivot arm.

A priority eject feature can be provided according to the present invention by extending the path to a priority output magazine, by providing a means for selectively removing the second stop from the path of the second carriage means to allow the second carriage means to travel along the path to a position opposite the priority output magazine, and by providing a third stop to arrest the motion of the second carriage means at the location opposite the priority output magazine. The priority recording medium can then be removed from the channel and placed into the priority output magazine in a manner similar to that in which a non-priority recording medium is placed in the output magazine.

It will thus be seen that the changer system of the present invention provides all the desired features of a central recording media changer system in a novel and uncomplicated manner, requiring less precision in the manufacture of the device and yet being more reliable than prior art central recording media changers used in dictation/transcription systems.

Thus, it is an object of the present invention to provide an improved changing system for discrete recording media.

It is a further object of the present invention to provide a changing system for discrete recording media in a central dictation/transcription system wherein recording media being moved from an input magazine to a transport mechanism and from a transport mechanism to an output magazine are moved simultaneously by carriages connected to a single drive means by clutch means.

It is a further object of the present invention to provide an improved system for changing discrete recording media into and out of engagement with a record/listen head utilizing an apparatus that may be manufactured to less precise tolerances than heretofore possible without sacrificing reliability of the system.

It is a further object of the present invention to provide an improved recording media changing system which, upon detection of a jammed condition, will automatically take corrective steps to unjam the apparatus and proceed with normal operation.

It is a further object of the present invention to provide a recording media changing system in a central dictation/transcription system including a means for ejecting recording media containing priority dictation at a priority location separate from the output location at which non-priority recording media are ejected.

Other objects, features and advantages of the present invention will become apparent upon reading the following specification when taken in conjunction with the accompanying drawing.

DETAILED DESCRIPTION

Figure 1:
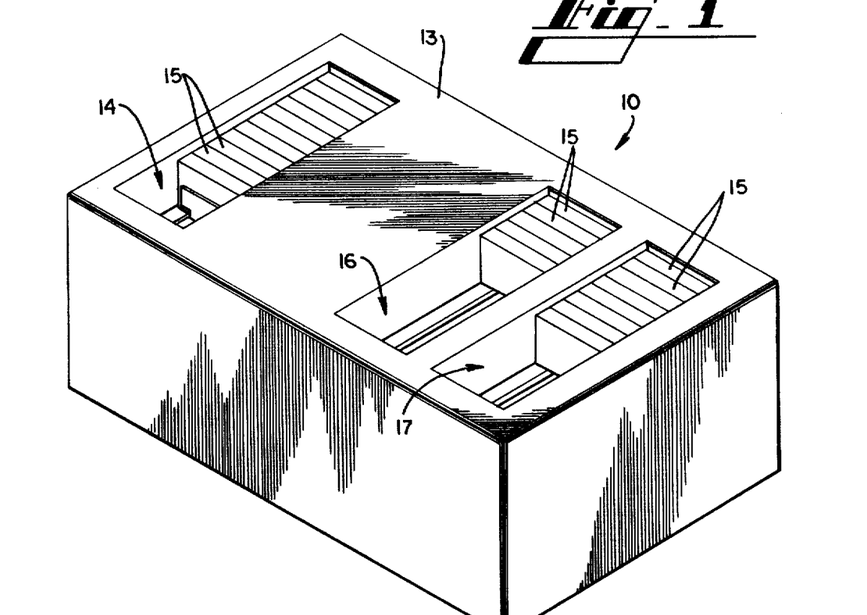
FIG. 1 is a pictorial view of an embodiment of a cassette changing apparatus embodying to the present invention.

Referring now in more detail to the drawing, in which like numerals refer to like parts throughout the several views, FIG. 1 shows a pictorial view of the exterior of an embodiment of a cassette changing apparatus 10 according to the present invention embodied in a dictation/transcription apparatus. An external cover 13 exposes an input magazine 14 containing a plurality of cassettes 15 for feeding to a transport mechanism for recording by a record/listen head, an output magazine 16 for receiving cassettes 15 that have been recorded or listened to at the record/listen head, and a priority output magazine 17 for receiving recorded cassettes that have been given a priority designation for transcription, as explained below. The size of the cassette changing apparatus 10 may be scaled to utilize any size cassette, such as a "C-60" standard cassette or an "MC-60" standard microcassette.

Figure 2:
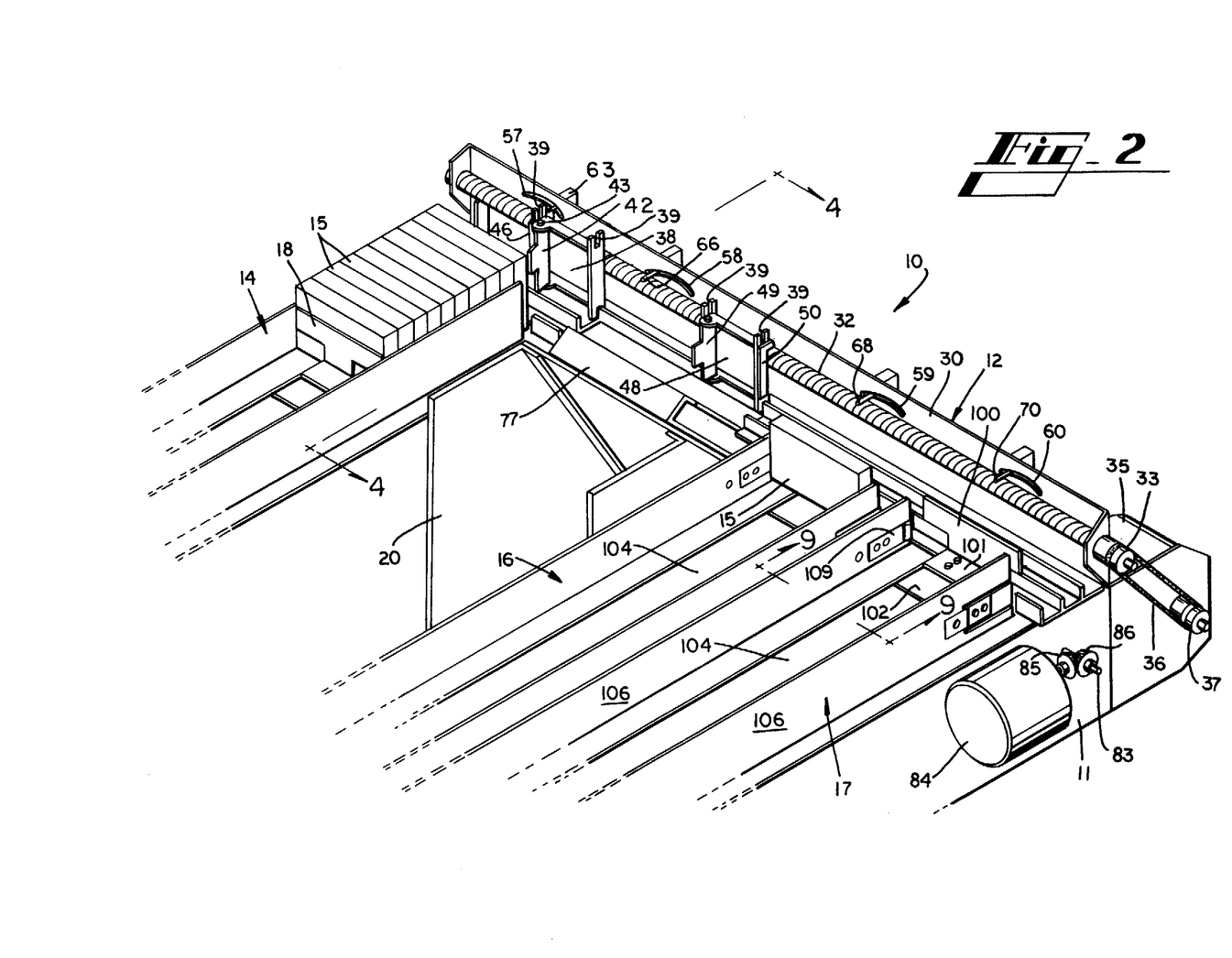
FIG. 2 is a pictorial view of the interior of the cassette changing apparatus shown in FIG. 1, with the upper portion of the channel housing broken away to expose the carriages and drive means.
Figure 3:
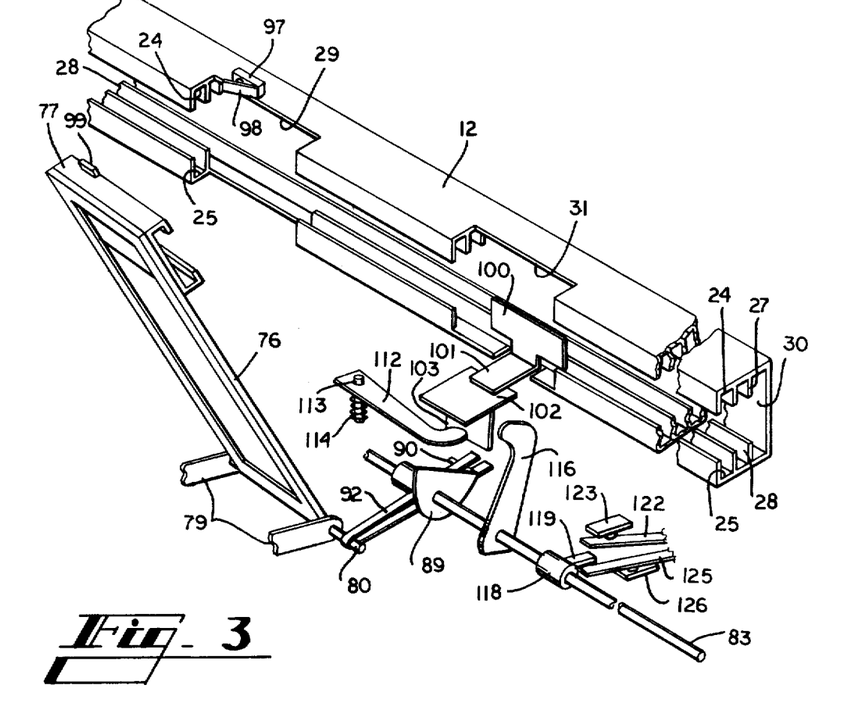
FIG. 3 is a semi-diagrammatic pictorial view of the channel housing, the transport load mechanism, and the cassette eject mechanism.

FIG. 2 shows the interior of the apparatus 10, which includes a frame 11 supporting a channel housing 12, (the upper portion of which is removed in FIG. 2 to expose the moving parts of the apparatus), the input, output and priority output magazines or trays 14, 16 and 17, respectively, and a transport mechanism 20. As best seen in FIG. 3, the channel housing 12 defines a cassette channel formed by an upper channel member 24 and a vertically aligned lower channel member 25. A spring loaded input magazine follower 18 urges the cassettes 15 in the input magazine 14 toward the channel 24, 25. Behind the cassette channel 24, 25 and also within the channel housing 12 are an upper track member 27 and a vertically aligned lower track member 28. The cassette channel 24, 25 is interrupted opposite the input magazine, by a channel load opening (not shown), opposite the transport mechanism 20 by a transport load opening 29, and opposite the output magazine by an eject opening 31. A similar opening (not shown in FIG. 3) is located opposite the priority output magazine 17.

Referring to FIG. 2, lead screw or worm gear 32 comprising a drive means is mounted to the back wall 30 of the channel housing 12, and extends parallel to the cassette channel 24, 25 and the track 27, 28. The lead screw is rotated in either direction by a reversible DC drive motor 35 by means of a belt 36 connecting a motor pulley 37 to a lead screw pulley 33 attached to the end of the lead screw 32.

A pair of cassette carriages, a load carriage 38 and an eject carriage 48, are mounted to slide along the track 27, 28 by means of track-engaging slots 39 which receive the upper track member 27 and the lower track member 28. The load carriage 38 includes a load carriage follower arm 42 pivotally mounted at the left end (nearest the input magazine) of the load carriage 38 by pivot pins 43 and biased by springs 44 to be normally in a position extending at right angles to the track 27, 28 into the plane of the cassette channel 24, 25. To the same end of the load carriage 38 is attached a load carriage trigger 46 which extends rigidly to the rear of the carriage 38 above the lead screw 32 in order to trigger limit switches extending through the back wall 30 of the channel housing 12, as will be explained in detail hereinafter.

The eject carriage 48 travels along the track 27, 28 positioned always nearer to the output magazines than the load carriage 38, as shown in FIG. 2. The eject carriage 48 also includes an eject carriage follow arm 49 similar to the follower arm 42. An eject carriage trigger 50 is attached to the right side (nearest the output magazines) of the eject carriage 48, and performs a similar function to that of the load carriage trigger 46.

Figure 8:
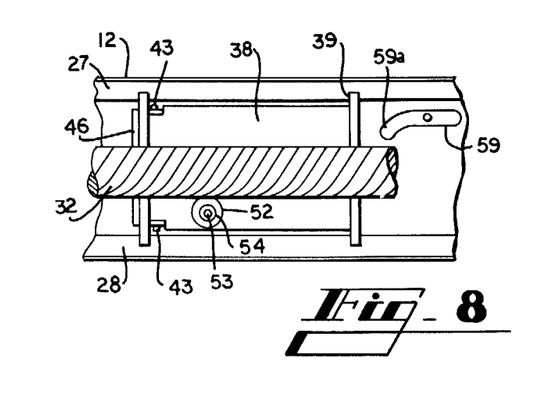
FIG. 8 is a rear view of the load carriage engaging the drive means, taken along line 8—8 of FIG. 7.

The load carriage 38 and the eject carriage 48 are each similarly operatively engaged with the lead screw 32 in a manner best shown in FIG. 8 (which depicts the load carriage 38). A pinion mount shaft 53 carrying a pinion gear 52 extends rearwardly from the load carriage 38. However, the shaft 53 and the pinion gear 52 are separated by a clutch 54 which permits rotation of the pinion gear 52 when the carriage 38 cannot move along tracks 27 and 18. Thus, as the worm gear or lead screw 32 rotates, the pinion gear 52 and the connected carriage 38 will travel along the lead screw 32 (the pinion gear 52 not rotating) so long as the carriage 38 is uninhibited in its sliding movement along the track 27, 28. However, if the carriage 38 encounters an obstruction while the lead screw 32 is rotating, the clutch 54 will permit the pinion gear 52 to rotate about the shaft 53 without moving along the lead screw 32.

Figure 5:
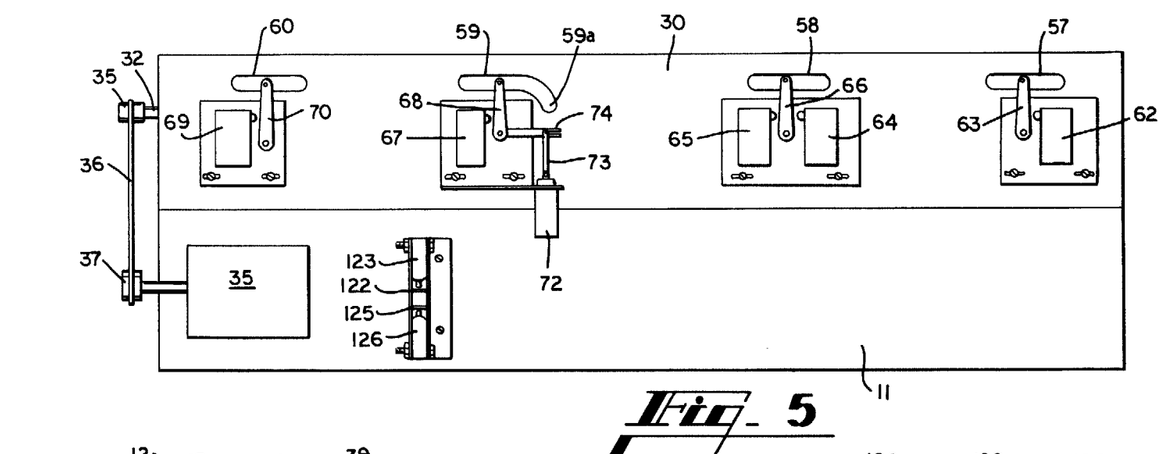
FIG. 5 is a rear elevational view of the apparatus shown in FIG. 2.
Figure 6:
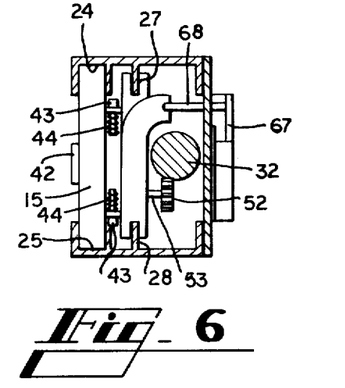
FIG. 6 is a side view of the channel housing, showing the follower arm of the eject carriage in an extended position for moving a cassette.
Figure 7:
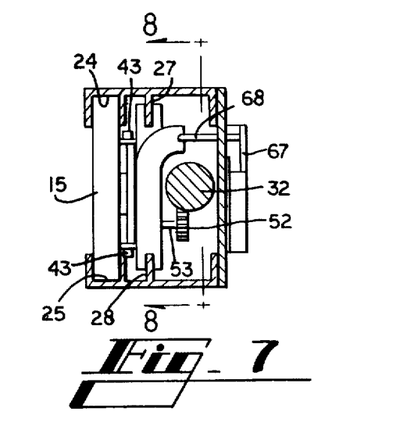
FIG. 7 is a side view of the cassette channel showing the follower arm of the eject carriage in a folded position behind a cassette.

In order to arrest the motion of the carriages 38 and 48 at precise desired positions, stops in the form of limit switch contact arms extend through slots in the back wall 30 of the channel housing 12 in the path of the load carriage trigger 46 and the eject carriage trigger 50. As shown in FIG. 5, slots 57, 58, 59 and 60 are cut through the back wall 30. Associated with the slot 57 is an input magazine limit switch 62 and an L-shaped contact arm 63 which extends from a pivot adjacent to the limit switch 62 in a conventional manner to the center of the slot 57 and thence through the back wall 30 into the path of the load carriage trigger 46. The limit switch 62 is closed by the trigger 46 when the load carriage 38 is moved by the lead screw 32 to its left-most or "home" position opposite to the input magazine. The contact arm 63 closes the limit switch 62 and also acts as a physical stop to prevent the lead screw 32 from driving the load carriage 38 past the input magazine 14. At the same time, the closing of the limit switch 62 sends a signal to control circuitry (to be described hereinafter) to indicate the positioning of the load carriage 38 opposite the input magazine.

Associated with the slot 58 are a pair of limit switches 64 and 65 which are mounted on the back wall 30 and share the same L-shaped contact arm 66 which extends through the slot 58 into the path of the load carriage trigger 46 and the eject carriage trigger 50. The contact arm 66 serves as a physical stop for the load carriage 38 when the carriage 38 is moving to the right in FIG. 2. When the carriage 38 thus engages the contact arm 66 the carriage 38 is precisely positioned opposite the transport mechanism 20, and the limit switch 65 is closed, sending a position indicating signal to the control circuitry. The contact arm 66 can also be engaged by the eject carriage trigger 50 of the eject carriage 48 when the carriage 48 is moving to the left in FIG. 2. When thus engaged, the contact arm 66 physically stops the eject carriage 48 at a position opposite the transport mechanism 20 and closes limit switch 64, sending a position indicating signal to the control circuitry.

Associated with the slot 59 are a limit switch 67 and a contact arm 68 which extends through the slot 59 into the path of the eject carriage trigger 50. The eject carriage trigger 50 engages the contact arm 68 when the eject carriage 48 is traaveling to the right in FIG. 2. The contact arm 68 physically stops the eject carriage 48 in a position opposite the output magazine 16 and closes the limit switch 67 to send an appropriate position indicating signal to the control circuitry. The slot 59, however, further includes a downward extension 59a. The contact arm 68 may be selectively rotated into the slot extension 59a by means of a solenoid 72, the piston rod 73 of which is pivotally connected to a retractor link 74 that is rigidly connected to the contact arm 68. When the contact arm 68 is rotated by the solenoid 72 into the slot extension 59a, the contact arm 68 is below the path of the eject carriage trigger 50 so that when the contact arm 68 is thus retracted the eject carriage 48 will pass by the slot 59 and continue to be driven by the lead screw 32 along the track 27, 28 toward the priority output magazine.

When the eject carriage 48 travels past the slot 59, it eventually engages a contact arm 70 which extends through the slot 60 in the back wall 30 and is associated with a limit switch 69. The contact arm 70 closes the limit switch 69, physically arresting the motion of the eject carriage 48 and causing an appropriate position indicating signal to be sent to the control circuitry. The contact arm 70 stops the motion of the eject carriage 48 directly opposite the priority output magazine 17.

Cassettes being carried by the load carriage 38 along the path defined by the channel 24, 25 from the input magazine to a position opposite the transport mechanism 20 enter a removable section 77 of the channel 24, 25, and are centered within the removable section 77 when the load carriage trigger 46 engages the contact arm 66. The removable channel section 77 is attached to a load pivot arm 76 which pivots about an axle 80 which is located below the channel 24, 25 and extends parallel to the channel. The axle is supported at either side of the load pivot arm 76 by a pair of support members 79 which are attached to the transport mechanism 20. The channel section 77 thus travels in an arc between a position within the opening 29 in the channel housing 12 wherein it forms an integral part of the channel 24, 25, and a position wherein it engages the transport mechanism 20.

Figure 4:
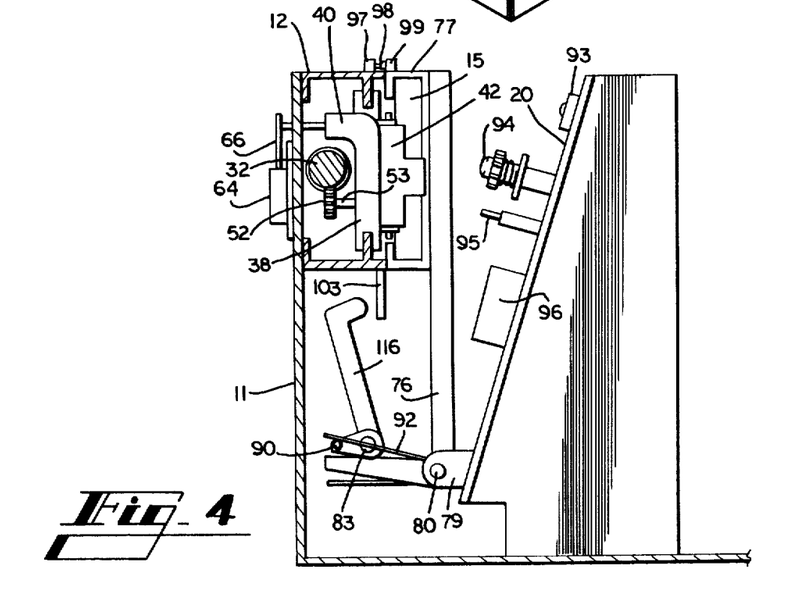
FIG. 4 is a vertical cross-sectional view of the apparatus shown in FIG. 2, taken along 4—4 of FIG. 2.

The transport mechanism 20 provides a conventional apparatus for dictation and transcription of a cassette moved into engagement therewith. Connections (not shown) are provided to remote dictating and/or transcribing locations and persons at such locations are enabled to operate the transport mechanism 20 to move the tape within the cassette and provide the normal recording and listening modes of operation. As shown in FIG. 4, the transport mechanism 20 includes spindles 94 for driving the tape within the cassette, a capstan 95 and a head mechanism 96 which includes a record/listen head and pinch rollers. The head mechanism 96 is movable with respect to the spindles and capstan in a conventional manner. Conventional circuitry (not shown) is provided to control operation of the transport mechanism 20 in recording or listening modes.

The channel section 77 and pivot arm 76 are driven as described above between the channel 24, 25 and the transport mechanism 20 indirectly by an arm drive shaft 83 connected to a reversible DC motor 84 by means of bevel gears 85 and 86, shown in FIG. 2. Fixed to the shaft 83 is a drive cam 89 including a longitudinally extending cam arm 90. A leaf spring 92 bent in the shape of a "V" is rigidly fixed to the axle 80 at the point of the V. The arms of the V extend on either side of the shaft 83 and on either side of the cam arm 90. When a shaft 83 is rotated counterclockwise in FIG. 3, the cam arm 90 lifts the upper branch of the leaf spring and thereby rotates the axle 80 and pivots the pivot arm 76 away from the channel housing 12 into engagement with the transport mechanism 20. When the shaft 83 is rotated in the opposite direction, the cam arm 90 moves the lower branch of the leaf spring and thereby pivots the pivot arm 76 and the channel section 77 back into engagement with the channel housing 12. The leaf spring 92 thus provides a "soft" drive for the pivot arm 76 in that the shaft 83 and cam arm 90 may continue to travel when the pivot arm 76 and channel section 77 have engaged either the transport mechanism 20, the channel housing 12 or an obstruction to proper engagement, without jamming the apparatus.

In order to provide signals indicating the position of the load arm 76, a load indicator limit switch 93 is mounted on the transport mechanism 20, as shown in FIG. 4, and a track position indicator limit switch 97 is mounted atop the channel housing 12 having a contact arm 98 extending in the direction of the opening 29. The limit switch 93 is closed by the load arm 76 itself, and the limit switch 97 is closed by a trigger block 99 mounted atop the channel section 77 so as to engage the contact arm 98 when the load arm 76 is pivoted into engagement with the channel housing 12.

Figure 9:
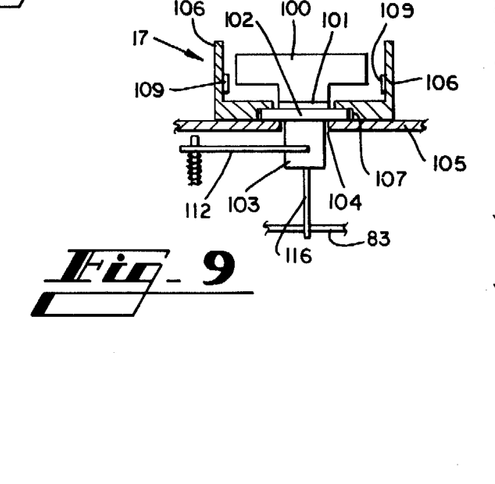
FIG. 9 is a front view of the eject arm mechanism shown in FIGS. 2 and 3, showing the output magazine in cross-section.

Associated with each output magazine, that is, the output magazine 16 and the priority output magazine 17, is the opening 31 in the channel 24, 25 and an eject slide 100, shown in FIGS. 2, 3 and 9. The ejecting mechanism will be described in detail only with respect to the output magazine 16. The eject slide 100 is normally positioned vertically along the inner wall of the path defined by the channels 24, 25, that is, the wall furthest from the output magazine. The slide 100 also includes a horizontally projecting tongue 101 which extends under the channel, replacing the portion of the bottom wall of the lower channel member 25 removed by the opening 31, and beyond the channel housing 12 into the output magazine 16 or 17. The tongue 101 is fixed to a flat, horizontal slot engaging member 102. As best shown in FIG. 9, the output magazines include a table 105 mounted on the frame 11 and defining an opening 104 therein opposite the eject slide 100, extending along the length of the output magazine 16 or 17. A pair of L-shaped side wall members 106 are fixed to the top of the table 105, and are especially shaped so as to form slots 107 for slidably receiving the slot engaging member 102 for transverse sliding movement along the magazine. Extending vertically downward from the slot engaging member 102 to a point below the table 105 is a drive tab 103.

Attached to the arm drive shaft 83 and rotatable with the cam 89 is an eject slide delivery arm 116 which is rotated by the shaft 83 in an arc which is intercepted by the drive tab 103. Thus, whenever the pivot arm 76 is rotated to engage the transport mechanism 20, the arm 116 causes the slot engaging member 102 to slide along the slots 107, carrying the eject slide 100 from its normal position along the inner side of the channel 24, 25 to a position entering the magazine 16 or 17. When a cassette is located opposite the output magazine at the opening 31, the movement of the eject slide 100 pushes the cassette from the channel 24, 25 through the opening 108 into the magazine, where it is retained by spring clips 109 located on each side wall member 106 near the entrance to the output magazine. In order to return the eject slide 100 to its normal position, an eject slide return arm 112 is mounted on a vertical shaft 113 and biased by a coil spring 114 into the drive tab 103. The delivery arm 116 operates against the biasing action of the return arm 112 so that when the delivery arm 116 is rotated by the shaft 83 away from the drive tab 103 the return arm 112 slides the slot engaging member 102 back toward the channel housing 12 until the eject slide 100 reaches its normal position.

The eject slide 100 associated with the priority output magazine 17 operates in the same way as the eject slide 100 associated with the output magazine 16, and the eject slides operate simultaneously with each other and with the transport load arm since they are all driven by the shaft 83.

The arm drive shaft 83 further includes a sleeve 118 which rotates with the shaft 83 and includes a load full travel trigger 119 extending outwardly from the sleeve 118. When the cam 89 is rotated a predetermined amount to engage the transport arm 76 with the transport mechanism 20, the load full travel trigger 119 engages a contact arm 122 which closes a limit switch 123. The closing of both limit switches 93 and 123 causes a signal to be sent to the control circuitry indicating that shaft 83 has reached its proper rotation and that pivot arm 76 is in its down position. When the shaft 83 is rotated a predetermined amount in the opposite direction to engage the channel section 77 with the channel housing 12, the full travel trigger 119 engages a contact arm 125 to close a limit switch 126. The closing of both limit switches 126 and 97 sends a signal to the control circuitry indicating shaft 87 has reached its proper opposite rotation and that pivot arm 76 is in its up position. The position indicating signals from the limit switches 123 and 126 are utilized to control the motor 84 in a manner to be described hereinbelow. However, because of the soft drive provided by the leaf spring 92, the predetermined rotational distances of travel permitted by the limit switches 123 and 126 do not have to be precisely the distance between the transport mechanism 20 and the channel housing 12, but can be somewhat greater.

The structure of the input magazine follower 18, though not shown in detail, is similar to that of the eject slides 100 in that the input magazine 14 defines an opening 104 and slots 107 in which a slot engaging member 102 attached to the follower 18 travels along the input magazine 14. A spring (not shown) continuously pulls the follower 18 toward the channel 24, 25. The input magazine 14 can be loaded manually with cassettes 15 by pulling the follower 18 away from the channel and standing the cassettes in front of the follower 18. The follower is then released and pushes the cassettes toward the channel until one of the cassettes enters the channel. As cassettes are carried along the channel by the load carriage 38, the follower 18 immediately pushes the remaining cassettes toward the channel until the next successive cassette in the input magazine enters the channel.

MECHANICAL OPERATION

Turning now to the operation of the apparatus 10 according to the invention to accomplish a normal change cycle, the initial position of the elements for explaining the mechanical operation of the apparatus is that the drive shaft 83 has been rotated to engage the load arm 76 with the transport mechanism 20 and to slide the eject slides 100 into the output magazines 16 and 17. A cassette 15 is therefore in position for dictation or transcription at the discretion of the operator using conventional controls as described above. The load carriage 38 is resting against the contact arm 63 at the left end of the track 27, 28 opposite the input magazine 14, from which a cassette 15 has been urged into the channel 24, 25 by the input tray follower 18. The eject carriage 48 is engaging the contact arm 66 and is held thereby in a position opposite the transport mechanism 20. The operation about to be described is enabled by a control circuit such as the one described in detail below.

Figure 10A:
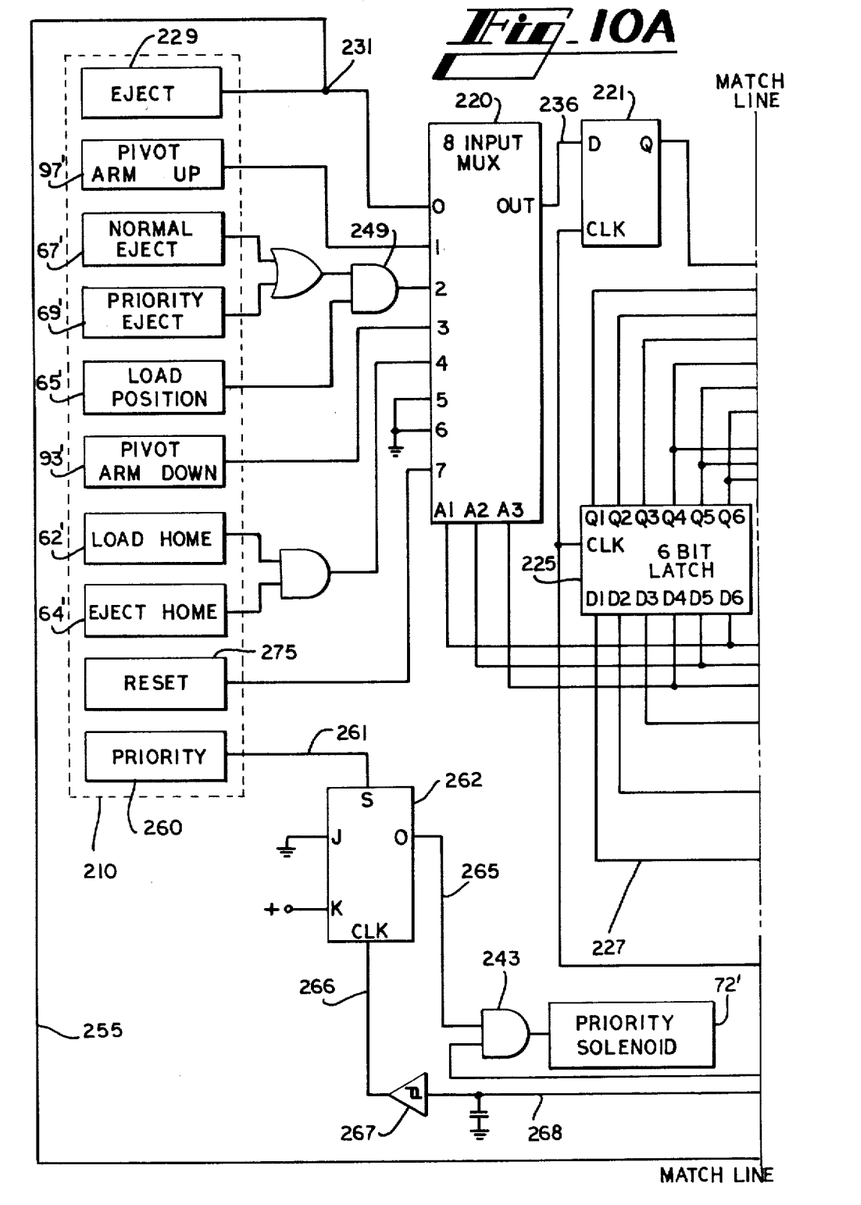
FIGS. 10A and 10B are schematic diagrams of the controller of the preferred embodiment of the present invention.
Figure 10B:
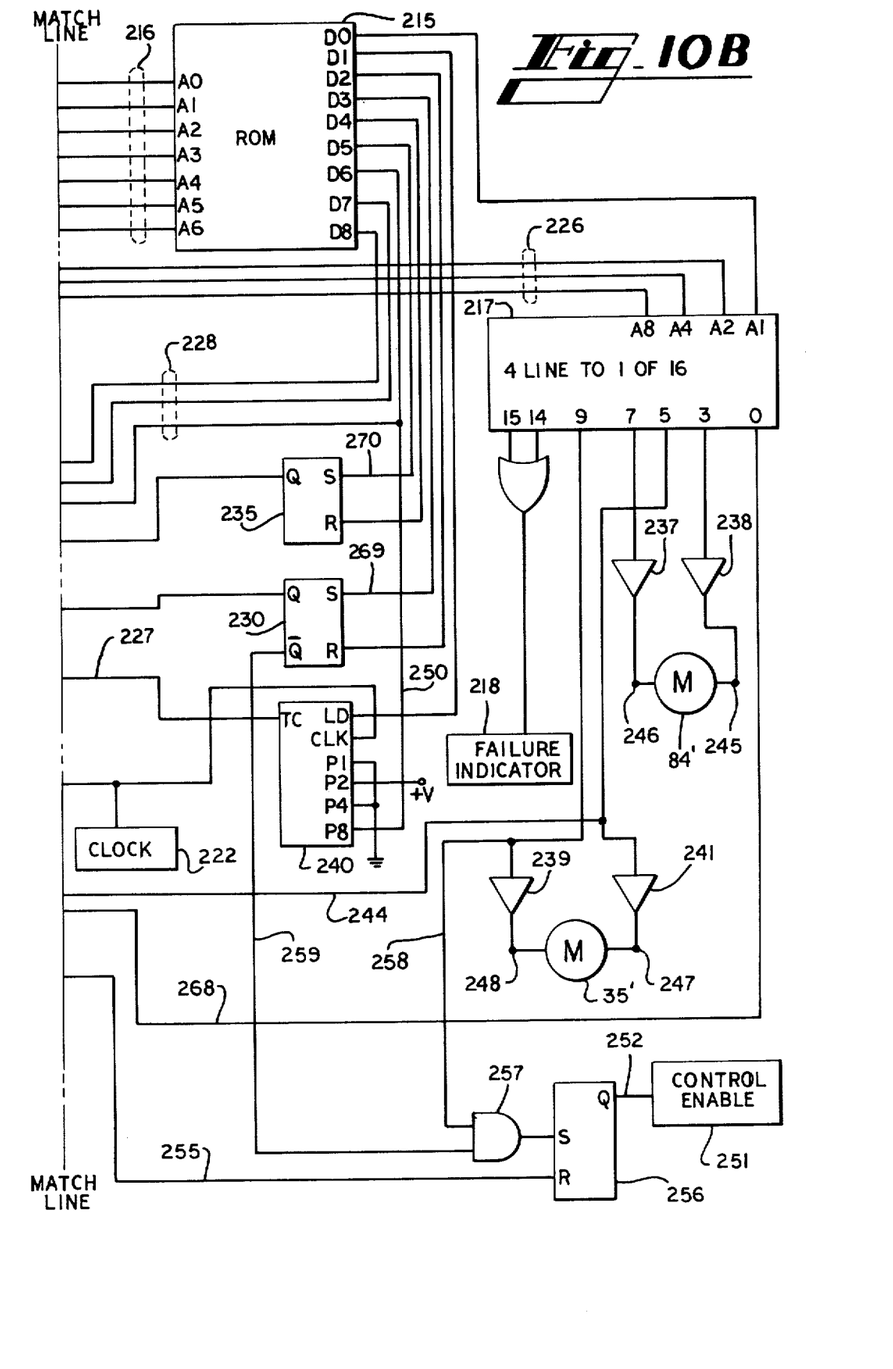

When the elements are in the positions just described, an operator may typically initiate the change cycle by depressing an eject switch shown as block 229 in FIG. 10. It will be understood that the output of block 229 can also be initiated automatically by a conventional end-of-tape ejection signal or tape substitution signal. The output of block 229 causes the control circuit to initiate the first subcycle by causing operation of the motor 84 to rotate the drive shaft 83 and thereby pivot the load arm and channel section 77 into engagement with the channel housing 12. When engaged, the trigger block 99 depresses the contact arm 98 of the limit switch 97 to provide a signal to the control circuitry indicating that the channel section 77 is in line with the remainder of the cassette channel 24, 25. The same rotation of the drive shaft 83 removes the delivery arm 116 from the path of travel of the drive tab 103 and connected slot engaging member 102 and eject slide 100. Thereupon the return arm 112 pushes the eject slide 100 back into its normal position at the inner edge of the cassette channel 24, 25, in the case of both the output magazine 16 and the priority output magazine 17. When the rotation of the shaft 83 carries the return full travel trigger 120 into contact with the contact arm 125, limit switches 126 and 97 are closed and the control circuitry stops the motor 84. Upon concurrence of the signals from the limit switches 97 and 126, the second subcycle begins as the main drive motor 35 is started and rotates the lead screw to cause motion of both the load carriage 38 and the eject carriage 48 to the right in FIG. 2. The follower arms 42 and 49 engage cassettes in the channel 24, 25 and push them down the channel to the right. The load carriage 38 carries a blank cassette from the input magazine 14, and the eject carriage 48 carries the cassettes just returned to the channel from the transport mechanism 20. Of course, if the change cycle is initiated when the apparatus has cassettes located only in the input magazine 14, the apparatus will not actually move any cassettes until the beginning of the second subcycle. When the lead screw has carried the load carriage 38 to a point where the load carriage trigger 46 engages the contact arm 66, the arm 66 engages the limit switch 65, sending a position indicating signal to the control circuitry and physically stopping the motion of the carriage 38. At this time the cassette pushed by the carriage 38 is precisely opposite the transport mechanism 20 within the removable channel section 77.

The lead screw 32 continues to rotate, but the clutch 54 associated with the pinion gear 52 allows the carriage 38 to remain in position while the pinion gear 52 rotates. Under normal conditions, that is, if the cassette has not been given priority designation, the continued rotation of the lead screw 32 carries the eject carriage 48 along the lead screw until the eject carriage trigger 50 engages the contact arm 68. The arm 68 engages the limit switch 67, sending a position indicating signal to the control circuitry and physically stopping the motion of the carriage 48 at a location directly across from the output magazine 16. Upon actuation of both the limit switch 65 and the limit switch 67, the control circuitry causes the main drive motor 35 to stop, terminating rotation of the lead screw 32 and ending the second subcycle. It is of course possible to reverse the bias of solenoid 72 which causes magazine 17 to serve as the normal output and magazine 16 as the priority output when operation of solenoid 72 intercepts an ejected cassette.

At this time the control circuitry initiates the third subcycle by causing the motor 84 to rotate the drive shaft 83 to move the load arm 76 into engagement with the transport mechanism 20. Simultaneously, the eject delivery arm 116 engages the drive tab 103 and moves the eject slide 100 forward to push the cassette associated with the eject carriage 48 from the channel 24, 25 into the output magazine 16 via the opening 31 in the channel housing 12. The cassette ejected by the eject slide 100 is engaged by the spring clips 109 in the side wall members 106 of the output magazine 16, to prevent the cassette from falling back into the channel 24, 25. It should be understood that output magazines 16 and 17 are each equipped with a spring follower (not shown) similar to follower 18 in input magazine 14 to prevent ejected cassettes from falling over.

The engagement of the load arm 76 and the channel section 77 with the transport mechanism 20 places the openings in the blank cassette over the spindles 94 and capstan 95 of the transport mechanism 20. The limit switch 93 is also closed, sending a position indicating signal to the control circuitry. After traveling a predetermined rotational distance, the shaft 83 causes the trigger 119 to depress the contact arm 122 to close the limit switch 123 and also send a signal to the control circuitry. When both limit switches 123 and 93 are closed, the control circuitry stops the motor 84. A conventional record sensing arm (not shown) associated with the transport mechanism 20 engages a knock out tab in the cassette to prevent accidental recording on a protected cassette, in a manner well known to those skilled in the art. This action can also function to test for the presence of a cassette in the channel section 77, and a means can be provided to send a signal to the control circuitry if no cassette is present.

A dictating person may now operate the transport mechanism and the head assembly 96 which are connected by conventional means (not shown) to one or more dictate stations. At this time the control circuitry automatically initiates the fourth subcycle and causes the main drive motor 35 to operate in reverse to return the load carriage 38 and the eject carriage 48 to their initial positions while recording or transcribing is occurring. The load carriage 38 engages the contact arm 63 and closes the limit switch 62, which sends a position indicating signal to the control circuitry. The eject carriage 48 engages the contact arm 66 which closes the limit switch 64, sending a similar position indicating signal to the control circuitry.

It will be noted that as the load carriage 38 begins to move past the input magazine 14, the load follower arm 42 contacts the cassette 15 that has been urged into the cassette channel 24, 25 by the spring-loaded input follower 18. Such contact causes the load follow arm 42 to pivot to the right about the pivot pins 43 against the pressure of the springs 44. This permits the carriage 38 to clear the cassette that is within the channel. The load follower arm 42 passes beyond the cassette and the channel prior to the engagement of the trigger 46 with the contact arm 63, allowing the springs 44 to cause the load follower arm 42 to snap back into a position wherein the load follower arm 42 extends into the path defined by the channel 24, 25, so that when moved again to the right, the load carriage 38 will push the cassette along the channel.

When both the load carriage 38 and the eject carriage 48 have returned to their original or "home" positions, the control circuitry stops the main drive motor 35, ending a normal change cycle. The dictating or transcribing person may continue to operate the transport deck to record or transcribe dictation in a known manner until he or she either desires to begin on a new cassette or receives an end of tape signal indicating that the cassette mounted on the transport mechanism 20 is filled to capacity. At this time the dictating or transcribing person may again depress the eject switch 229, to begin the above-described cycle.

If a dictating person desires to designate dictation recorded on a particular cassette for priority transcription, a priority switch 260 shown diagrammatically in FIG. 10, may be depressed prior to depressing the change initiation switch. The control circuitry causes the solenoid 72 to retract the piston rod 73 and thereby withdraw the contact arm 68 into the slot extension 59a of the slot 59, in response to depression of the priority switch 260. In the second subcycle of the next change cycle, the eject carriage 48 carrying the recorded cassette from the position opposite the transport mechanism 20 encounters no resistance to its motion until the eject carriage trigger 50 engages the contact arm 70 which extends through the slot 60 opposite the priority output magazine 17. The operation of the clutch 54 in the load carriage 38 allows the load carriage 38 to remain in proper position opposite the transport mechanism 20 while the eject carriage 48 travels the additional distance down the track 27, 28 to reach the output magazine 17. Once the eject carriage 48 has reached the priority magazine 17, the normal operation of the motor 84 and shaft 83 in the third subcycle will cause the delivery arm 116 associated with the priority output magazine to eject the cassette carried by the eject carriage 48 into the priority output magazine 17 in a manner identical to that in which cassettes are normally ejected into the output magazine 16 as previously described. The contact arm 68 remains retracted into the slot extension 59a until the eject carriage 48 has been returned by the lead screw 32 to its home position in engagement with the contact arm 66. This engagement closed the limit switch 64 which sends a signal to the control circuitry enabling the power to the solenoid 72 to be cut off. A spring (not shown) within the solenoid 72 returns the piston rod 73 to an extended position, whereby the contact arm 68 is returned to its normal position within the slot 59.

CONTROL CIRCUIT

FIG. 10 is a schematic diagram of the control circuitry which controls the functions and operations of the preferred embodiment described hereinabove. The control circuitry is responsive to a plurality of inputs shown in block 210 to drive motors 35' and 84'. Motor 35' of FIG. 10 will be understood to correspond to motor 35 shown in FIG. 5 and to be the motor which drives lead screw 32 (FIG. 8).

The control circuitry of FIG. 10 will be understood by those skilled in the art to be a state machine controlled by a read only memory (ROM) 215. ROM 215 is a one hundred twenty-eight by nine bit read only memory, the contents of which are shown in Table I hereinbelow. Addresses A0–A6 appear on address inputs designated as 216 on FIG. 10. The outputs of ROM 215 appear on data outputs D0–D8.

The outputs of external inputs 210 are steered to the A0 input of ROM 215 through an eight input multiplexer (MUX) 220. The inputs to ROM 215 are latched by a six bit input latch 225 (A1–A6) and D-type flip-flop 221 (A0).

As will be explained hereinbelow, a complete change cycle for the disclosed embodiment of the present invention comprises a plurality of subcycles. As will be apparent from the foregoing description of operation of the preferred embodiment, certain subcycles which include movement of pivot arm 76 should take less time than subcycles involving movement of cassette carriages 38 and 48. Counter 240 is loaded with an appropriate number upon the initiation of a subcycle and will overflow if completion of the subcycle is not accomplished within a predetermined amount of time corresponding to the number loaded. Thus it may be seen that counter 240 is used to provide a variable timing means for determining whether a portion of a normal change cycle (a subcycle) has been completed within a predetermined time.

The outputs of ROM 215 are decoded by a four line to one of sixteen decoder 217, the outputs of which will drive motors 35' and 84' and a failure indicator 218.

Counter 240, input latch 225 and D flip-flop 221 are driven by a common clock 222.

The contents of ROM 215 are shown in Table 1 and are as follows:

TABLE 1

| Address (Decimal) | ROM Address | ROM Output |
|---|---|---|
| 0 | 0000000 | 000010110 |
| 1 | 0000001 | 001000010 |
| 2 | 0000010 | 000010110 |
| 3–14 | — | 000010110 |
| 15 | 0001111 | 000010110 |
| 16 | 0010000 | 001000001 |
| 17 | 0010001 | 010010110 |
| 18 | 0010010 | 011001010 |
| 19 | 0010011 | 010010110 |
| 20 | 0010100 | 001000001 |
| 21 | 0010101 | 011100110 |
| 22 | 0010110 | 111000000 |
| 23 | 0010110 | 111000000 |
| 24 | 0011000 | 001000001 |
| 25 | 0011001 | 010010110 |
| 26 | 0011010 | 111000000 |
| 27 | 0011011 | 111000000 |
| *28 | 0011100 | 111000000 |
| *29 | 0011101 | 111000000 |
| *30 | 0011110 | 111000000 |
| *31 | 0011111 | 111000000 |
| 32 | 0100000 | 010000001 |
| 33 | 0100001 | 011010110 |
| 34 | 0100010 | 100001010 |
| 35 | 0100011 | 011010110 |
| 36 | 0100100 | 010000001 |
| 37 | 0100101 | 100100110 |
| 38 | 0100110 | 111000000 |
| 39 | 0100111 | 111000000 |
| 40 | 0101000 | 010000001 |
| 41 | 0101001 | 011010110 |
| 42 | 0101010 | 111000000 |
| 43 | 0101011 | 111000000 |
| *44 | 0101100 | 111000000 |
| *45 | 0101101 | 111000000 |
| *46 | 0101110 | 111000000 |
| *47 | 0101111 | 111000000 |
| 48 | 0110000 | 011000001 |
| 49 | 0110001 | 100010110 |
| 50 | 0110010 | 001001010 |
| 51 | 0110011 | 100010110 |

TABLE 1-continued

| Address (Decimal) | ROM Address | ROM Output |
|---|---|---|
| 52 | 0110100 | 011000001 |
| 53 | 0110101 | 001100110 |
| 54 | 0110110 | 111000000 |
| 55 | 0110111 | 111000000 |
| 56 | 0111000 | 011000001 |
| 57 | 0111001 | 100010110 |
| 58 | 0111010 | 111000000 |
| 59 | 0111011 | 111000000 |
| *60 | 0111100 | 111000000 |
| *61 | 0111101 | 111000000 |
| *62 | 0111110 | 111000000 |
| *63 | 0111111 | 111000000 |
| 64 | 1000000 | 100000001 |
| 65 | 1000001 | 000010110 |
| 66 | 1000010 | 010001010 |
| 67 | 1000011 | 000010110 |
| 68 | 1000100 | 100000001 |
| 69 | 1000101 | 010100110 |
| 70 | 1000110 | 111000000 |
| 71 | 1000111 | 111000000 |
| 72 | 1001000 | 100000001 |
| 73 | 1001001 | 000010110 |
| 74 | 1001010 | 111000000 |
| 75 | 1001011 | 111000000 |
| *76 | 1001100 | 111000000 |
| *77 | 1001101 | 111000000 |
| *78 | 1001110 | 111000000 |
| *79 | 1001111 | 111000000 |
| *80 | 1010000 | 111000000 |
| 81–111 | 1010000 | 111000000 |
| 112 | 1110000 | 111000000 |
| 113 | 1110001 | 000010110 |
| 114–127 (odd) | 111XXX1 | 000010110 |
| 114–127 (even) | 111XXX0 | 111000000 |

\* DON'T CARE - State should not occur
X DON'T CARE

As will be apparent from the description hereinbelow, the contents of ROM 215 as shown in Table 1 will cause the control circuitry of FIG. 9 to control the cassette changing apparatus of the preferred embodiment as previously described herein. Table 2 below defines the ROM address input bits, the ROM output bits and shows the state indicator bits and the state to which each combination corresponds.

TABLE 2

| (1) Address Inputs | | |
|---|---|---|
| A4–A6 - | State | |
| A3- | Repeat Flag | |
| A2- | Error Flag | |
| A1- | Counter Overflow | |
| A0-Input | | |

| (2) ROM Outputs | | |
|---|---|---|
| D6–D8 | State indicator bits | |
| D5- | Set Repeat Flag | |
| D4- | Clear Repeat Flag | |
| D3- | Set Error Flag | |
| D2- | Clear Error Flag | |
| D1- | Preset Counter | |
| D0- | Output Enable | |

| (3) State Indicator Bits | Reciprocal State | State |
|---|---|---|
| 000 | | READY |
| 001 | 011 | MOVE PIVOT ARM UP |
| 010 | 100 | MOVE CARRIAGES TO LOAD/EJECT POSITION |
| 011 | 001 | MOVE PIVOT ARM DOWN |
| 100 | 010 | MOVE CARRIAGES HOME |
| 111 | | STOP/ERROR |

Note that the states shown in Table 2, except for READY and STOP/ERROR, correspond to the subcycles described hereinabove.

As indicated in Table 2 above, the three highest address bits A4–A6 comprise a three bit word defining the present state. Note that the values of these three bits also appear as the three most significant bits of the input to decoder 217 along a three bit bus 226.

As shown in Table 2, the 000 state is a ready state in which the preferred embodiment is available for use as a dictation recorder and no change cycle or change subcycle is in progress. The 001 state is the state in which load pivot arm 76 is moving up, i.e., that is toward channel 12 (FIG. 2).

The 010 state is a state in which motor 35 is operating to move cassette carriages 38 and 48 from their home position to their load and eject positions. 011 state is a state in which load pivot arm 76 is moving down toward tape transport deck 20 (FIG. 4) and the 100 state is that in which the cassette carriages are returning to their home positions.

As may be seen from Tables 1 and 2, the 101 and 110 states of the state indicator bits should not occur since these are not defined states for the control circuitry shown in FIG. 9. The 111 state is indicated as a stop/error state to which the control circuitry of FIG. 10 will default upon failure to accomplish a particular subcycle of the entire change cycle after a predetermined number of attempts.

As may be seen from Table 2 and will be apparent from examination of Table 1, each of the states 001–100 has associated therewith a reciprocal state which is shown in Paragraph 3 of Table 2. The reciprocal states of each of states 001–100 is the state which may be considered "the opposite" of that state. For example, the reciprocal of the state which moves load pivot arm 76 up (001) is the state which moves the pivot arm down (011) and vice versa. Similarly the states in which cassette carriages 38 and 48 move in opposite directions are considered reciprocal states. It will therefore be appreciated that the term "reciprocal states" as used herein refers to a functional reciprocity and not necessarily to a mathematical reciprocity.

A normal change cycle for the apparatus of the preferred embodiment has been described hereinabove. As will become apparent from the description of the circuitry of FIG. 10 to follow, the preferred embodiment will attempt to repeat a subcycle of the entire change cycle which the apparatus fails to perform within a predetermined amount of time. For each subcycle of an entire normal change cycle, a predetermined amount of time is allotted for the control circuitry to complete the subcycle. A normal subcycle comprises the time from which the state corresponding to the subcycle begins until the time in which the next normal sequential state (beginning a second subcycle) is entered. Therefore, when load pivot arm 76 begins to move up when the control circuitry of FIG. 10 is in its 001 state, the circuitry should make the transition to its 010 state within a predetermined period of time. If the transition to the next state is not accomplished within the allotted time, the reciprocal state is generated by the controller in order to attempt to "unjam" any mechanical problems which may have prevented successful completion of the first subcycle.

If the reciprocal state is exited within the predetermined time allottment, the controller will attempt to repeat the subcycle which it originally failed to complete. If the apparatus fails for a second time to complete the subcycle, the controller will go to its 111 state indicating that it is unable to complete a particular subcycle of its entire normal change cycle and will activate a failure indicator device shown as block 218 on FIG. 9. It is preferable that such a failure indicator will comprise an audible and/or visible warning so that a supervisor may attend to the apparatus to try to correct the problem which is preventing its proper operation. It is of course possible to provide a failure indicator at the dictate station (not shown).

In the case in which a particular subcycle is not completed within its allotted time, and the reciprocal subcycle is likewise incomplete at the end of its allotted time, the controller of FIG. 10 will also go to its stop/error state.

It will therefore be appreciated that the controller of FIG. 10 provides a means which will perform a reciprocal subcycle upon the failure of the apparatus to accomplish a first subcycle. It will further be appreciated that the controller of FIG. 10 provides a means for attempting to perform a subcycle of a complete change cycle a predetermined number of times before the apparatus enters a stop/error state and is disabled. It will further be appreciated that complete change cycles may take varying amounts of time to be completed, depending upon the number of subcycles and the particular subcycles which must be repeated. In the preferred embodiment shown in FIG. 10, each subcycle will be attempted twice and upon failure to complete the subcycle, the recorder is disabled. However, the choice of two attempts to complete the subcycle is only preferred and as will be apparent from the description to follow, counters may be substituted for flip-flops 230 and 235 in order to increase the number of times an embodiment of the present invention will attempt to repeat a particular subcycle before exiting to a stop/error state.

First the operation of a normal change cycle will be described. While dictation is being recorded on the apparatus shown herein, the controller of FIG. 10 will be in its ready state (000). As may be seen from Table 1, each occurrence of an all zero address provides an output word with a logical one occurring at outputs D1, D2, and D4. As may be seen from Table 2 and from FIG. 10, a one on output D1 presets counter 240, the one on output D2 clears error flag 230 and a one on output D4 clears repeat flag 235. Therefore, in the absence of an input at address A0, the 000 state will continually be refreshed since constant presetting of counter 240 prevents a logical one from appearing on its trickle count (TC) output on line 227 and the remaining inputs to six bit latch 225 are zero due to the continual assurance that flip-flops (flags) 230 and 235 remain clear. Note that the state indicator bits (D6–D8) also appear on a three bit bus 228 which provides the address inputs to input multiplexer 220. As may be seen from FIG. 10, the zero address of multiplexer 220 is the output of an eject switch 229.

As will be appreciated by those skilled in the art, block 229 may represent any signal which indicates that it is time to eject the cassette currently engaging the transport. Such an output may be provided by a hand operated switch available to the dictator, or by a conventional end-of-tape ejection signal, or by a tape substitution signal generated by apparatus such as that shown in U.S. Pat. No. 4,024,354 which is assigned to the assignee of the present invention. It is to be understood that the occurrence of an eject signal from block 229 causes a logical one to appear at point 231 and to be provided to zero input of multiplexer 220.

Therefore when the controller is in its 000 state, the address inputs of multiplexer 220 cause the signal at point 231 to be provided to the multiplexer output which appears on line 236 as the input to D flip-flop 221. When eject signal generating apparatus 229 provides a logical one, upon the next positive transition of clock 222, a logical one is latched on the output of D flip-flop 221 thus applying address one to the address inputs of ROM 215. Reference to Table 1 shows that the ROM will output the 001 state on state indicator bus 228 and provides a one at the D1 output which will cause counter 240 to be parallel loaded on the next positive transition of clock 222.

In the preferred embodiment, clock 222 operates at approximately two Hz. As may be seen from FIG. 10, the D6 output of ROM 215 (lowest significant state indicator bit) is provided to the P8 parallel input of counter 240. Counter 240 is a four bit binary counter. Therefore when counter 240 is loaded, the number 1010 will appear at its output. Therefore five cycles of clock 222 are required to make counter 240 count to its 1111 state during which a logical one will appear on line 227 from the trickle count (TC) output. Five cycles of clock 222 take approximately two and one-half seconds. Therefore when the 001 state is first provided as the next state output on state indicator bus 228, the numbers loaded into counter 240 which corresponds to allowing two and one-half seconds to elapse before counter 240 overflows. Since the 001 state is the state in which the load pivot arm 76 is being raised, it will be appreciated that the controller of FIG. 9 allows the preferred embodiment two and one-half seconds in which to raise the pivot arm into channel 12.

Note that as soon as 001 appears on state indicator bus 228, the address inputs of multiplexer 220 are changed and the multiplexer 220 then begins to provide the data at its one input to its output. The one input carries the state of the pivot arm up limit switch 97' which will be understood to correspond to the output of limit switch 97 shown in FIG. 3.

The same clock transition which loads counter 240 also latches the 001 state on the outputs Q4-Q6 of latch 225 and will latch a zero onto the output of D flip-flop 221, thus accessing address sixteen of ROM 215. As may be seen from Table 1, the word in address 16 maintains the 001 output of state indicator bits (D6-D8) and provides a one at the D0 output.

The D0 output of ROM 215 provides the least significant bit of the input to decoder 217. As may be seen from FIG. 10, outputs 3, 5, 7, and 9 of decoder 217 control motors 35' and 85'. It will therefore be appreciated that a logical one on the D0 output of ROM 215 assures that one of the odd numbered outputs of decoder 217 will be activated. Since motors 35' and 84' are all controlled by odd numbered outputs, it will be appreciated that the D0 output of ROM 215 provides an output enable function as indicated in Paragraph 2 of Table 2. With the 001 state on state address bus 226 and a one from the D0 output of ROM 215, it will be appreciated that the three output of decoder 217 goes high. Outputs 3, 5, 7, and 9 of decoder 217 are each buffered by one of a plurality of drivers 237, 238, 239, and 241. With the three output of decoder 217 high, point 245 becomes positive with respect to point 246 which is held approximately to ground and motor 84' will be caused to rotate in a direction corresponding to raising of load pivot arm 76.

When the changer is operating normally, limit switch 97' will provide an output prior to overflow of counter 240. Upon the next positive clock transition, a logical one will be latched on the output of flip-flop 221 thus addressing the word at address 17 of ROM 215. Reference to Table 1 shows that the word in address 17 provides the 010 state from the state indicator bits, ones on the D4 and D2 outputs which provide clear signals to flip-flops 230 and 235, and will change the address inputs to multiplexer 220 so that the data at its two input will be provided to line 236. On the next transition of clock 222, address thirty-two of ROM 215 is accessed and as may be seen from Table 1, the word at address 32 contains a one at the D0 (output enable) output. In this state the word 0101 appears at the inputs to decoder 217 therefore causing the five output of the decoder to go high. This causes point 247 to be positive with respect to point 248 thus causing motor 35' to rotate in a direction corresponding to movement of cassette carriages 38 and 48 from the home position to the previously-described load and eject positions.

As may be seen in FIG. 10, the two input to multiplexer 220 will be provided with a logical one from AND gate 249 when load position limit switch 65' which corresponds to limit switch 65 shown on FIG. 5 and either of limit switches 67' or 69' which correspond to switches 67 and 69 on FIG. 5, respectively, are closed. Therefore multiplexer 220 is then providing an output on line 236 which will go high when cassette carriages 38 and 48 have arrived at the appropriate positions for loading a new cassette and ejecting the previously-completed cassette.

Note also that when the clock transition, which places the machine in a 010 state, occurs a logical zero is present on the D6 output of ROM 215 and is provided along line 250 to the P8 parallel input of counter 240. Therefore at the beginning of the 010 state, counter 240 will be loaded with 0010. It will therefore take thirteen cycles of clock 222 to cause counter 240 to overflow and thus entry into the 010 state presets counter 240 to a number corresponding to approximately six and one-half seconds (thirteen cycles at 2 Hz). Entry into the 010 state constitutes the beginning of a second subcycle of the chain cycle and it will be appreciated that counter 240 has now been loaded with a number corresponding to a different allotted time for completion of the second subcycle. Therefore it will be appreciated that the present invention provides a variable timing means for timing a plurality of subcycles of a complete change cycle. From Table 2 it may be seen that the least significant state indicator bit is zero for subcycles in which motor 35a is activated causing cassette carriages 38 and 48 to move and therefore approximately six and one-half seconds are provided for each of these subcycles. The least significant state indicator bit is a one in state 001 and 011 which corresponds to movement of load pivot arm 76 during operation of motor 84' and both of these subcycles are allotted approximately two and one-half seconds. It will be appreciated by those skilled in the art that entry into any state may be decoded into a signal which will load a number corresponding to any predetermined time into counter 240 by gating the state indicator bits into a decoded set of parallel inputs to counter 240.

From the foregoing description and the information on FIG. 10, Table 1, and Table 2, it will be apparent that as each subcycle is successfully completed, the controller of FIG. 10 will advance to the next state and provide appropriate outputs to motors 35' and 84'. Note that in state 011, the seven output of decoder 217 is high which causes point 246 to be positive with respect to point 245 thus causing motor 84' to rotate in the opposite direction than it rotated during state 001. Similarly when carriages 38 and 48 are returning to their home positions, point 248 is positive with respect to point 247 and motor 35' will be rotated in the opposite direction from its rotation during the 010 state.

Entry into each state which corresponds to the beginning of a subcycle will always cause counter 240 to preset to an appropriate number for the time allotted for completion of the subcycle and furthermore will change the address inputs of multiplexer 220 so that the appropriate input indicating completion of the subcycle will be provided to line 236.

It will further be appreciated that output 97' may be modified so as to provide an output only when both limit switch 97 and limit switch 123 (FIG. 5) are closed. Similarly output 93' may be modified to provide an output only when both limit switches 93 and 126 (FIG. 5) are closed. It is within the skill of the art to provide a state for a controller of the preferred embodiment which will detect closure of one of switches 123 or 126 without the corresponding closure of either switch 93 or 97 but it is preferred to detect only the combination or the individual switches 93 or 97 on load pivot arm 76 in order to limit the required size for ROM 215.

Another advantage of the present invention is that it allows dictation to begin prior to completion of the entire substitution cycle. Note that once the subcycle during which load pivot arm 76 is lowered onto transport 20 is completed, dictation may begin prior to the arrival of carriages 38 and 48 at their home positions.

Control enable block 251 on FIG. 10 represents any conventional means for enabling controls at a dictate station to operate a dictation recorder transport and recording and playback electronics. When a logical one appears on line 252, the controls at the dictate station will be enabled to operate the recorder. For example, block 251 may represent a plurality of AND gates having line 252 as a common input and the outputs of the AND gates being provided to the transport and electronics controls for the dictation recorder.

Note that when an eject signal is first provided by eject signal generating apparatus 229, a logical one appears at point 231. This logical one is provided along line 255 to the R input of RS flip-flop 256. Therefore at the beginning of an eject cycle, the logical one on line 255 causes flip-flop 256 to clear placing a logical zero on line 252 thus disabling the normal dictation controls provided at a dictate station. The set input of flip-flop 256 is the output of AND gate 257 which has as inputs lines 258 and 259. As may be seen from FIG. 10, line 258 carries the nine output of decoder 217 and line 259 carries the negated output of error flip-flop 230. It will therefore be appreciated that line 258 goes high for the first time in a change cycle when the outputs from ROM 215 indicate that the 100 (move carriages home) state has been entered and output D0 is providing a logical one. This corresponds to entry into the 100 state with motor 35' rotating in a direction which causes carriages 38 and 48 to begin to return to their home position. Line 259 will be a logical one whenever error flip-flop 230 is cleared and therefore the entry into the 100 state without error flip-flop being set indicates that a new cassette has been successfully lowered to transport 20 and dictation may begin. When this occurs, the output of AND gate 257 goes high setting flip-flop 256 thus re-enabling the controls from a dictate station to transport 20 and associated recording and playback electronics.

The operation of solenoid 72 (FIG. 5) in order to pass an ejected cassette to the priority output magazine has been described previously herein. Block 260 in FIG. 10 represents any conventional switch which may be used by the dictator to indicate that the cassette upon which dictation is being recorded or a cassette about to be ejected should be placed in the priority output magazine. It will therefore be appreciated that operation of priority switch 260 causes a logical one to appear on line 261 which is provided to the direct set input of flip-flop 262. The setting of flip-flop 262 causes a logical one to appear on line 265. When the five output of decoder 217 goes high, both inputs to AND gate 243 are one thus activating priority solenoid 72' which will be understood to correspond to solenoid 72 shown in FIG. 5.

Flip-flop 262 has its inputs permanently set at J=0 K=1 and therefore a positive transition on line 266 to the clock (CLK) input of flip-flop 262 will cause the flip-flop to clear. Line 266 is the output of a Schmitt trigger buffer 267 which has as its input the signal on line 268. As may be seen from FIG. 10, line 268 will go to a logical zero when decoder 217 detects the 000 (ready) state of the controller and thus flip-flop 262 will be cleared after completion of an entire substitution cycle.

From the foregoing it will be appreciated that the dictator may operate priority switch 260 at any point during dictation on the particular cassette to be provided to the priority output magazine. Thus, the decision to designate a particular cassette as containing priority dictation does not have to be made prior to seizure of the recorder and indeed may be made after the substitution cycle has begun. For example if a dictator decides that a particular segment of dictation upon which he is currently working should have priority treatment, he may simply operate priority switch 260 and the cassette when ejected with appear in the priority output storage.

As described hereinbefore, the preferred embodiment of the controller for the present invention shown in FIG. 10 will attempt to complete a reciprocal subcycle upon detection of the failure of the apparatus to successfully complete any subcycle. Upon successful completion of the reciprocal subcycle, the subcycle which originally failed will again be attempted. Failure on the second attempt to complete the subcycle will cause the controller to go to a stop/error (111) state which will activate failure indicator 218. It is of course possible to modify the contents of ROM 215 so that a new substitution cycle will begin upon failure to complete a subcycle so as a state which has load pivot arm 76 in channel member 12 may be accomplished.

The contents of ROM 215 as set forth in Table 1 adequately show how the circuitry of FIG. 10 is controlled to provide the above described function. However it is believed that an example of one such repeated subcycle will be helpful in order to fully understand this feature of the controller.

For example, if a cassette is loaded upside down into input magazine 14 (FIG. 2), spindle 94 (FIG. 4) will not engage the hubs of the reels internal to the cassette and therefore pivot arm 76 may not be properly lowered to bring the cassette into operative engagement with the transport.

Consider that the first two subcycles (states 001 and 010) have been successfully completed and that the controller of FIG. 10 has just entered the 011 state which will attempt to move pivot arm 76 down. Entry into the 011 state presets counter 240 to a 1010 count (corresponding to two and one-half seconds) and selects the three input of multiplexer 220 to be provided to line 236. Therefore when the 011 state begins the inputs to ROM 215 select address 48. As may be seen from Table 1, the contents of address 48 cause the D0 output of ROM 215 to go high and will drive the seven output of decoder 217 high thus operating motor 84' to attempt to lower load pivot arm 76.

Since in the situation described, load pivot arm 76 may not be completely lowered, limit switch 93 will not be closed. Therefore no one will appear on line 236 as the output of multiplexer 220.

At the end of approximately two and one-half seconds, counter 240 overflows placing a one on line 227 which is provided to the D1 input of six bit latch 225. The next positive clock transition will latch the one from line 227 onto the Q1 output of latch 225.

It is to be understood that in the situation described the controller of FIG. 10 has detected that a particular subcycle has not been completed in its allotted time. When the latched one appears at the Q1 output of latch 225, it is provided to the A1 address input of ROM 215 which is the counter overflow input (Table 2). Therefore the fifty address will now be present on the inputs of ROM 215. From Table 1 it may be seen that the 001 state is provided as the output for state indicator bits D6-D8. A one also appears at the D1 and D3 outputs. Note from Table 2 that 001 state is the reciprocal state of the 011 state and thus the controller will now attempt to perform the reciprocal subcycle of raising pivot arm 76 back toward channel member 12. The word in address fifty causes presetting of counter 240 and the one in the D3 position is provided along line 269 to set error flip-flop 230.

As will be known to those skilled in the art, occasionally a cassette will have the spokes of its center hubs aligned with the spokes of spindle 94 in such a manner that the cassette, though properly positioned, will not fit onto the transport. In cases such as these it is often possible that a second attempt to engage the cassette with the transport will be successful and therefore it is desirable to attempt to load the cassette onto transport 20 a second time. However in the example being described herein it will not be possible to load the cassette.

Continuing with the example, it will be appreciated that the twenty address of ROM 215 is now being accessed since the 001 state is on the state indicator bits and the A2 bit (error flag) is high due to the setting of flip-flop 230. As may be seen from Table 1, the word at address location 20 will in fact cause motor 84' to raise pivot arm 76 and when an output appears from limit switch 97', the twenty-one address of ROM 215 will be addressed. As may be seen from Table 1, the output word from address twenty-one will place the controller back into 011 state and also provides logical one outputs at D5, D2, and D1.

The D1 output presets counter 240, the D2 output clears error flag 230 and the D5 output sets repeat flag 235 since the D5 output is connected via line 270 to the set input of flip-flop 235. The setting of flip-flop 235 indicates that a particular state corresponding to a particular subcycle has been entered for the second time as a result of a previous failure to successfully complete the subcycle. Therefore the controller is back in the 011 state attempting to lower the pivot arm 76 toward the transport and the repeat flag as embodied by flip-flop 235 is set.

Since in the example described the cassette may not be successfully lowered, once again counter 240 will overflow at the end of two and one-half seconds. When this occurs the one provided along line 227 will be latched onto the Q1 output of latch 225 after the next transition of clock 222. Therefore both the A1 and A3 address bits of ROM 215 are high and the state indicator bits indicate the 011 state.

This corresponds to address 58. As may be seen from Table 1, address 58 provides all ones as the state indicator bits and all zeros as the remaining output bits. As is shown in Table 2, the 111 state is the stop/error state. In the 111 state motors 35' and 84' are turned off and either output 14 or 15 of decoder 217 will be high. As may be seen from FIG. 10, a logical one on either output 14 or 15 of decoder 217 will cause a logical one to appear as the input to failure indicator 218.

As described hereinbefore, failure indicator 218 is preferably manifested as an audible warning or the combination of an audible warning and a visible indication from an embodiment of the present invention so that a supervisory person will be alerted to a jam within the particular recorder. It is of course possible to construct an embodiment of the present invention which will perform a different function upon the failure to perform a specified subcycle successfully in a predetermined number of attempts. For example, instead of going to the 110 state upon the second failure to lower pivot arm 76, it would be possible to change the contents of ROM 215 so that the 100 state was entered followed by the beginning of a new complete substitution cycle.

From the foregoing it will be appreciated that the controller disclosed herein has several advantages over controllers for changers which either allow a hard jam condition to be maintained or simply stop when a substitution cycle has not been completed in a predetermined amount of time. The controller and the changer disclosed herein will correct the jam conditions which occur that can be corrected by the repetition of subcycles. This unique feature is an improvement over changers which simply jam or stop after a certain period of time.

Once the 111 state has been entered, it may be seen (address 112 on Table 1) that the controller will remain in this state until an input from reset output 275 is received. Reset output 275 may best be embodied as a selectively operable switch located at either a supervisor's panel or on the body of an embodiment of the present invention. Note that when the controller is in the 111 state, all ones are provided on state indicator bus 228 and thus the seven input of multiplexer is provided to line 236. Therefore after a supervisory person has responded to activation of failure indicator 218 and removed the upside down cassette from the machine, that person may operate reset switch 275 which provides a logical one to line 236. As may be seen from Table 1, all words in ROM 215 which have all ones as their most significant bits and a one as its least significant bit (indicating an input from reset switch 275) output a word which places the controller back in its ready (000) state presets counter 240 and clears flip-flops 235 and 230.

From the contents of ROM 215 as reflected in Table 1, it will be appreciated by those skilled in the art that the controller of FIG. 9 will place itself in the reciprocal state when it fails to complete a particular subcycle and then will attempt the particular subcycle for a second time. If it is successful on the second attempt operation will proceed normally. If the second attempt to complete the subcycle is unsuccessful the controller will go to the 111 state.

As will be appreciated by those skilled in the art, read only memory 215 may be embodied by a number of equivalent devices including a plurality of gates having inputs corresponding to A0–A6 which decode those inputs to the outputs D0–D8 as described in Table 1.

While this invention has been described in detail with particular reference to preferred embodiments thereof, it will be understood that variations and modifications can be effected within the spirit and scope of the invention as described hereinbefore and as defined in the appended claims.

We claim:

1. A changing apparatus for successively engaging a plurality of discrete recording media with a transport mechanism associated with a record/listen head comprising
   a channel defining a longitudinally extending path running adjacent to said transport mechanism;
   an input magazine adjacent to said channel for storing a plurality of said recording media;
   an output magazine adjacent to said channel and longitudinally spaced from said input magazine;
   means for urging said recording media from said input magazine into said channel;
   a first and a second carriage means within said channel for carrying said recording media along said channel;
   a drive means for moving said first and second carriage means in either of two opposite directions along said channel;
   a first stop along said channel for arresting motion of said first carriage means moving from said input magazine toward said transport mechanism at said locations opposite said transport mechanism;
   a second stop for arresting motion of said second carriage means moving from said transport mechanism toward said output magazine at a location opposite said output magazine;
   said arresting of said carriage means being independent of continued operation of said drive means;
   transport load means for moving a recording medium in said channel transversely from said path into and out of engagement with said transport mechanism; and
   an ejecting means simultaneously operative with said transport load means for moving a recording medium carried by said second carriage means transversely of said path into said output magazine.

2. The apparatus of claim 1 wherein both of said carriage means are coupled to said drive means by a clutch means.

3. In an apparatus for successively engaging a plurality of discrete recording media with a transport mechanism including driving means for moving said discrete recording media from an input store to said transport and for moving said discrete recording media from said transport to an output store, the improvement of:
   a controller for operating said driving means through a complete change cycle comprising a plurality of subcycles;
   said controller comprising a timing means responsive to initiation of one of said plurality of subcycles for providing a predetermined alloted time; and
   failure detection means responsive to said timing means for causing said driving means to initiate a reciprocal subcycle upon detection of a failure of said apparatus to complete said one of said plurality of subcycles in said predetermined alloted time.

4. Apparatus as recited in claim 3 wherein said controller further comprises:
   repeating means for causing said driving means to repeat said one of a plurality of subcycles a predetermined number of times upon an occurrence of successive failures of said apparatus to complete said one of a plurality of subcycles.

5. Apparatus as recited in claim 3 wherein said timing means is a variable timing means for providing a particular one of a plurality of predetermined allotted times associated with said one of a plurality of subcycles upon said initiation of said one of a plurality of subcycles.

6. A changing apparatus comprising means for successively moving a plurality of discrete record media from an input magazine to a record position along a channel and for moving said discrete record media along said channel from said record position to an output position;
   a first conveying means for conveying one of said record media from said record position to a stationary transport mechanism disposed away from said channel and a second conveying means for urging another one of said record media into an output magazine;
   a motor for providing force to a transverse linkage;
   said transverse linkage comprising means for providing positive drive between said motor and said second conveying means and a spring connecting said motor and said first conveying means for providing said force to said first conveying means urging said record media from said record position toward said stationary transport mechanism in response to operation of said motor.

7. A changing apparatus for successively engaging a plurality of discrete recording media with a transport mechanism associated with a record/listen head comprising
   a channel defining a longitudinally extending path running adjacent to said transport mechanism for carrying and guiding said discrete recording media including a movable section of said channel at a location opposite said transport mechanism;
   a pivot arm connected to said movable section of said channel and pivotable about a pivot axle parallel to said channel;
   a load drive means for pivoting said pivot arm about said pivot axis to carry said movable section of said channel from a position aligned with said channel to a position engaging said transport mechanism; and
   a pivot arm coupling means connecting said load drive means to said pivot arm and responsive to said pivot arm encountering an obstacle prior to fully completing travel into or out of engagement with said transport mechanism, for allowing said pivot arm to come to rest independent of continued operation of said load drive means.

8. A changing apparatus for successively engaging a plurality of discrete recording media with a transport mechanism associated with a record/listen head comprising
- a channel defining a longitudinally extending path running adjacent to said transport mechanism including movable section of said channel at a location opposite said transport mechanism;
- an input magazine adjacent to said channel for storing a plurality of said recording media;
- an output magazine adjacent to said channel and longitudinally spaced from said input magazine;
- a first and a second carriage means within said channel for carrying said recording media along said channel;
- a drive means for moving said first and second carriage means along said channel;
- a first stop along said channel for arresting motion of said first carriage means moving from said input magazine toward said transport mechanism at said location opposite said transport mechanism; and
- a second stop for arresting motion of said second carriage means moving from said transport mechanism toward said output magazine to provide a recording medium positioned at said second stop at a location opposite said output magazine;
- a pivot arm connected to said movable section of sad channel and pivotable about a pivot axle parallel to said channel;
- a load drive means for pivoting said pivot arm about said pivot axis to carry said movable section of said channel from a position aligned with said channel to a position engaging said transport mechanism;
- a pivot arm coupling means connecting said load drive means to said pivot arm and responsive to said pivot arm encountering an obstacle prior to fully completing travel into or out of engagement with said transport mechanism, for allowing said pivot arm to come to rest independent of continued operation of said load drive means;
- a slidable eject arm operative to push said recording medium positioned at said second stop from said channel into said output magazine; and
- means for connecting said slidable eject arm to said load drive means so as to provide sliding motion of said eject arm simultaneously with said pivoting motion of said pivot arm.

9. A changing apparatus for successively engaging a plurality of discrete recording media with a transport mechanism associated with a record/listen head comprising
- a channel defining a longitudinally extending path running adjacent to said transport mechanism;
- an input magazine adjacent to said channel for storing a plurality of said recording media;
- a first output magazine adjacent to said channel and longitudinally spaced from said input magazine;
- a second output magazine located beyond said output magazine and adjacent to said channel;
- a first and a second carriage means within said channel for carrying said recording media along said channel;
- a drive means for moving said first and second carriage means along said channel;
- transport load means for moving a recording medium in said channel transversely from said path into and out of engagement with said transport mechanism;
- a first stop along said channel for arresting motion of said first carriage means moving from said input magazine toward said transport mechanism at a location opposite said transport mechanism;
- a second stop for arresting motion of said second carriage means moving from said transport mechanism toward said first output magazine at a location opposite said output magazine;
- a third stop along said channel for arresting motion of said second carriage means moving from said transport mechanism toward said second output magazine at a location opposite said second output magazine;
- said arresting of said carriage means being independent of continued operation of said drive means; and
- a means for selectively removing said second stop from the path of said second carriage means to allow said second carriage means to reach said third stop.

* * * * *